United States Patent
Hong et al.

(10) Patent No.: US 10,979,105 B2
(45) Date of Patent: Apr. 13, 2021

(54) DATA TRANSMISSION METHOD IN WLAN AND LTE AGGREGATION SYSTEM

(71) Applicant: Beijing Xiaomi Mobile Software Co., Ltd., Beijing (CN)

(72) Inventors: Wei Hong, Beijing (CN); Juejia Zhou, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/232,254

(22) Filed: Dec. 26, 2018

(65) Prior Publication Data

US 2019/0140708 A1 May 9, 2019

Related U.S. Application Data

(63) Continuation of application No. PCT/CN2016/087582, filed on Jun. 29, 2016.

(51) Int. Cl.
*H04W 4/00* (2018.01)
*H04B 7/0413* (2017.01)
(Continued)

(52) U.S. Cl.
CPC ...... *H04B 7/0413* (2013.01); *H04W 72/0446* (2013.01); *H04W 72/1215* (2013.01);
(Continued)

(58) Field of Classification Search
CPC ..... H04W 76/12; H04W 76/27; H04W 88/10; H04W 80/02; H04W 84/12
See application file for complete search history.

(56) References Cited

U.S. PATENT DOCUMENTS

2014/0204903 A1 7/2014 Kim et al.
2014/0293970 A1* 10/2014 Damnjanovic ....... H04L 5/0078
370/336
(Continued)

FOREIGN PATENT DOCUMENTS

CN 101056191 A 10/2007
CN 103701952 A 4/2014
(Continued)

OTHER PUBLICATIONS

LTE-WLAN-radio-Core, "LS on authentication and encryption between UE and WLAN for aggregation", 3GPP TSG-RAN WG2 Meeting #90 R2-152915, May 29, 2015, section 1.
(Continued)

*Primary Examiner* — Abdelnabi O Musa
(74) *Attorney, Agent, or Firm* — Finnegan, Henderson, Farabow, Garrett & Dunner, L.L.P.

(57) ABSTRACT

A data transmission system includes one or more evolutional Node B (eNBs), one or more wireless local area network terminations (WTs), one or more wireless local area network access points (WLAN APs), and user equipment (UE). The WTs are connected to the eNBs in a one-to-one correspondence, and each WT is connected to at least one WLAN AP. The UE is configured to send an LTE data packet to a target eNB through an LTE network. The UE is configured to send to the WLAN AP a WLAN data packet including a MAC address of a target WT connected to the target eNB. The WLAN AP is configured to send the WLAN data packet to the target WT according to the MAC address of the target WT. The target WT is configured to send the WLAN data packet to the target eNB for aggregation with the LTE data packet.

20 Claims, 10 Drawing Sheets

(51) Int. Cl.
| | |
|---|---|
| *H04W 88/10* | (2009.01) |
| *H04W 72/12* | (2009.01) |
| *H04W 76/12* | (2018.01) |
| *H04W 76/27* | (2018.01) |
| *H04W 72/04* | (2009.01) |
| *H04W 84/12* | (2009.01) |
| *H04W 80/02* | (2009.01) |

(52) U.S. Cl.
CPC ........... *H04W 76/12* (2018.02); *H04W 76/27* (2018.02); *H04W 88/10* (2013.01); *H04W 80/02* (2013.01); *H04W 84/12* (2013.01)

(56) References Cited

U.S. PATENT DOCUMENTS

| | | | |
|---|---|---|---|
| 2015/0245409 | A1 | 8/2015 | Medapalli |
| 2016/0338074 | A1* | 11/2016 | Chou ................. H04W 76/27 |
| 2017/0265069 | A1* | 9/2017 | Palanigounder ...... H04L 9/0643 |
| 2017/0332317 | A1* | 11/2017 | Nuggehalli ........... H04W 48/18 |
| 2018/0132143 | A1* | 5/2018 | Sirotkin ............... H04W 88/06 |
| 2019/0045402 | A1* | 2/2019 | Nagasaka ............. H04W 36/28 |

FOREIGN PATENT DOCUMENTS

| | | |
|---|---|---|
| CN | 109417831 A | 3/2019 |
| RU | 2414104 C2 | 3/2011 |
| WO | WO 2016/089264 A1 | 6/2016 |
| WO | WO 2017/194026 A1 | 11/2017 |

OTHER PUBLICATIONS

Nokia Networks, "Support for LTE-WLAN Aggregation and Interworking Enhancement", 3GPP TSG-RAN WG3 Meeting #89 R3-151743, Aug. 28, 2015, section XX1.2.

International Search Report of PCT Application No. PCT/CN2016/087582, dated Mar. 22, 2017, issued by the ISA/CN—State Intellectual Property Office of the P.R. China.

Mediatek Inc., Beijing Xiaomi Mobile Software Co., Uplink routing for enhanced LWA, 3GPP TSG-RAN2#94 meeting (Tdoc R2-164135) Nanjing, China, May 13, 2016.

Intel Corporation, Running 36.300 CR for LTE-WLAN Radio Level Integration and Interworking Enhancement, 3GPP TSG-RAN2 Meeting 91bis (R2-154997), Malmo, Sweden, Oct. 19, 2015.

Search Report for Russian Application No. 2019102323/07(004074) dated Sep. 12, 2019.

Office Action dated Sep. 12, 2019, in counterpart Russian Application No. 2019102323/07(004074) and English translation thereof.

Office Action dated Oct. 22, 2019, in counterpart Chinese Application No. 201680000718.8 and English translation thereof.

First Office Action in counterpart Chinese application No. 201680000718.8, dated Nov. 29, 2018.

Second Office Action in counterpart Chinese application No. 201680000718.8, dated Feb. 21, 2019.

CATT: "Discussion on Support of UL Bearer in Rel-14 LWA", 3GPP TSG-RAN WG2 Meeting #93bis, Dubrovnik, Croatia, Apr. 11-15, 2016, 4 pgs.

ZTE: "Consideration on the simultaneously configuration of LTE/WLAN aggregation and Dual Connnectivity", 3GPP TSG-RAN WG2 meeting #89bis, Bratislava, Slovakia, Apr. 20-24, 2015, 4 pgs.

Extended Search Report for European Application No. 16906624.8 from the European Patent Office, dated Mar. 25, 2019.

Japanese Office Action dated Aug. 6, 2020, in counterpart Japanese Application No. 2018-568801.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.3.0 (Mar. 2016).

* cited by examiner

DATA TRANSMISSION METHOD IN WLAN AND LTE AGGREGATION SYSTEM

CROSS-REFERENCE TO RELATED APPLICATIONS

This application is a continuation of International Application No. PCT/CN2016/087582, filed Jun. 29, 2016, the entire contents of which are incorporated herein by reference.

TECHNICAL FIELD

The present disclosure generally relates to the field of communication, and in particular, to a data transmission system, a data transmission method, a data aggregation method and device.

BACKGROUND

Long Term Evolution-Wireless Local Area Network Aggregations (LTE-WLAN Aggregations, or LWA) is a technology for simultaneously transmitting data using a long term evolution (LTE) network and a wireless local area network (WLAN).

When performing downlink data transmission using LWA, an evolutional Node B (eNB) transmits a part of downlink data to user equipment (UE) through the LTE network, and simultaneously transmits the remaining downlink data to the UE through the WLAN according to an medium access control (MAC) address of the UE. Then UE aggregates the two parts of received data to implement downlink transmission of data.

SUMMARY

The present disclosure provides a data transmission system, a data transmission method, a data aggregation method and device.

In a first aspect, there is provided a data transmission system, comprising: one or more evolutional Node B (eNBs), one or more wireless local area network terminations (WTs), one or more wireless local area network access points (WLAN APs), and user equipment (UE). The WTs are connected to the eNBs in a one-to-one correspondence, and each WLAN AP is connected to at least one of the WTs. The UE is configured to send a long term evolution (LTE) data packet to a target eNB through an LTE network, the target eNB being an eNB that establishes a radio resource control (RRC) connection with the UE. The UE is configured to send a WLAN data packet to the WLAN AP, the WLAN data packet comprising a medium access control (MAC) address of a target WT connected to the target eNB. The WLAN AP is configured to send the WLAN data packet to the target WT according to the MAC address of the target WT. The target WT is configured to send the WLAN data packet to the target eNB. The target eNB is configured to aggregate the LTE data packet and the WLAN data packet.

In a second aspect, there is provided a data transmission method, comprising: sending, by user equipment (UE), a long term evolution (LTE) data packet to a target evolutional Node B (eNB) through an LTE network, the target eNB being an eNB that establishes a radio resource control (RRC) connection with the UE; and sending, by the UE, a wireless local area network (WLAN) data packet to a wireless local area network access point (WLAN AP), the WLAN data packet comprising a medium access control (MAC) address of a target WT connected to the target eNB, wherein the WLAN AP is configured to send the WLAN data packet to the target WT according to the MAC address of the target WT; the target WT is configured to send the WLAN data packet to the target eNB; and the target eNB is configured to aggregate the LTE data packet and the WLAN data packet.

In a third aspect, there is provided a data aggregation method, comprising: receiving, by an evolutional Node B (eNB), a long term evolution (LTE) data packet sent by user equipment (UE) through an LTE network, the UE establishing a radio resource control (RRC) connection with the eNB; receiving, by the eNB, a wireless local area network (WLAN) data packet sent by a wireless local area network termination (WT) connected to the eNB, the WLAN data packet comprising a medium access control (MAC) address of the WT and being sent to the WT by a wireless local area network access point (WLAN AP) connected to the WT according to the MAC address; and aggregating, by the eNB, the LTE data packet and the WLAN data packet.

In a fourth aspect, there is provided a data transmission device, comprising: a first sending module configured to send a long term evolution (LTE) data packet to a target evolutional Node B (eNB) through an LTE network, the target eNB being an eNB that establishes a radio resource control (RRC) connection with user equipment (UE); a second sending module configured to send a wireless local area network (WLAN) data packet to a wireless local area network access point (WLAN AP), the WLAN data packet comprising a medium access control (MAC) address of a target wireless local area network termination (WT) connected to the target eNB; wherein the WLAN AP is configured to send the WLAN data packet to the target WT according to the MAC address of the target WT; the target WT is configured to send the WLAN data packet to the target eNB; and the target eNB is configured to aggregate the LTE data packet and the WLAN data packet.

In a fifth aspect, there is provided a data aggregation device, comprising: a first receiving module configured to receive a long term evolution (LTE) data packet sent by user equipment (UE) through an LTE network, the UE establishing a radio resource control (RRC) connection with an evolutional Node B (eNB); a second receiving module configured to receive a wireless local area network (WLAN) data packet sent by a wireless local area network termination (WT) connected to the eNB, the WLAN data packet comprising a medium access control (MAC) address of the WT and being sent by a wireless local area network access point (WLAN AP) connected to the WT to the WT according to the MAC address; and an aggregating module configured to aggregate the LTE data packet and the WLAN data packet.

In a sixth aspect, there is provided user equipment (UE), comprising: a processor; and a memory for storing instructions executable by the processor; wherein the processor is configured to: send a long term evolution (LTE) data packet to a target evolutional Node B (eNB) through an LTE network, the target eNB being an eNB that establishes an LTE connection with the UE; and send a wireless local area network (WLAN) data packet to a wireless local area network access point (WLAN AP), the WLAN data packet comprising a medium access control (MAC) address of a target WT connected to the target eNB, wherein the WLAN AP is configured to send the WLAN data packet to the target WT according to the MAC address of the target WT; the target WT is configured to send the WLAN data packet to the target eNB; and the target eNB is configured to aggregate the LTE data packet and the WLAN data packet.

In a seventh aspect, there is provided an evolutional Node B (eNB), comprising: a processor; and a memory for storing instructions executable by the processor; wherein the processor is configured to: receive a long term evolution (LTE) data packet sent by a user equipment (UE) through an LTE network, the UE establishing a radio resource control (RRC) connection with the eNB; receive a WLAN data packet sent by a wireless local area network termination (WT) connected to the eNB, the WLAN data packet comprising a medium access control (MAC) address of the WT and being sent by a wireless local area network access point (WLAN AP) connected to the WT to the WT according to the MAC address; and aggregate the LTE data packet and the WLAN data packet.

The technical solutions provided by the present disclosure may include the following advantageous benefits.

By adding the MAC address of the target WT connected to the target eNB in the WLAN data packet, the WLAN AP, after receiving the WLAN data packet sent by the UE, can forward the MAC data packet to the target WT according to the MAC address. Finally, the target WT sends the WLAN data packet to the target eNB, thereby achieving uplink transmission of the WLAN data packet, which solves the problem that when the WLAN AP is connected to a plurality of WTs, due to that the WLAN AP may not accurately forward the WLAN data packet to the target WT after receiving the WLAN data packet sent by the UE, the WLAN data packet may not be transmitted to the target eNB. In the case that the WLAN AP is connected to the plurality of WTs, the WLAN AP can forward the WLAN data packet to the target WT according to the MAC address of the target WT in the WLAN data packet, thereby ensuring that the WLAN data packet is transmitted to the target eNB and improving the accuracy of uplink transmission of the WLAN data packet.

It is to be understood that both the foregoing general description and the following detailed description are merely exemplary and explanatory and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the invention as recited in the appended claims.

In the present disclosure, a unit may be a program or instruction that is stored in a memory and is capable of implementing certain functions. A module may be a functional structure that is logically divided. The module may be implemented by pure hardware or a combination of hardware and software.

In the present disclosure, an eNB may be an evolutional Node B in LTE. In an LWA system, when receiving data sent by a core network, the eNB which serves as a bridge between UE and the core network is responsible for sending a part of the data to the UE through an LTE network, and sending the remaining data to the UE through a WLAN network. The UE aggregates the received data to implement downlink transmission of the data from the core network. When receiving the data transmitted by the UE through the LTE network and the WLAN network, the eNB is responsible for aggregating the received data and sending the aggregated data to the core network, thereby uploading uplink data to the core network.

In the present disclosure, an RRC connection, i.e., a radio resource control connection, may be a connection established between the eNB and the UE. Through the RRC connection, the eNB can implement the functions such as the system information broadcasting, paging, and signaling transmission to the connected UE.

In the present disclosure, a WT may be a WLAN Termination. In the LWA system, WTs are connected to the eNBs in a one-to-one correspondence and are generally fixed together. A WT may be connected to a plurality of WLAN APs at the same time and is responsible for monitoring and managing each of the WLAN APs connected thereto. In the LWA system, the eNB downlink-transmits a WLAN data packet to the UE through the WLAN network, or receives a WLAN data packet uplink-transmitted by the UE through the WLAN network. Each WLAN data packet passes through the WT connected to the eNB.

Figure 1:
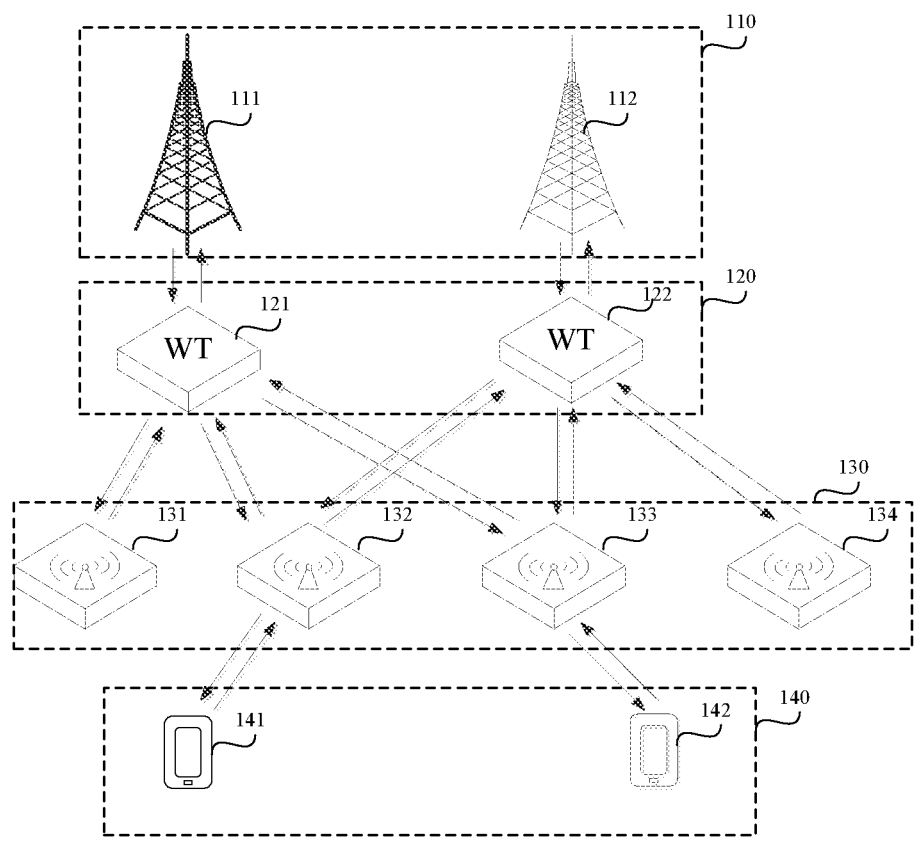
FIG. 1 illustrates a schematic diagram of a data transmission system provided by an exemplary embodiment of the present disclosure.

FIG. 1 illustrates a schematic diagram of a data transmission system provided by an exemplary embodiment of the present disclosure. The data transmission system comprises eNBs 110, WTs 120, WLAN APs 130, and UE 140.

The eNBs 110 are evolutional Node B in LTE. The eNBs 110 may transmit downlink WLAN data and downlink LTE data, and receive uplink WLAN data and uplink LTE data. In addition, the eNBs 110 may encapsulate data from the core network into LTE data and WLAN data, and downlink-transmit the LTE data and the WLAN data to the UE. The eNBs 110 may also aggregate the received uplink WLAN data and LTE data, and send the aggregated data to the core network. In an actual networking, each of the eNBs 110 may be a macro base station, a micro base station, a pico base station, a repeater, or the like. The specific number and specific location of the eNBs 110 are not limited in the embodiments of the present disclosure.

The eNBs 110 are connected to the WTs 120 in a one-to-one correspondence. Generally, the eNBs 110 and the WTs 120 may be fixed together or connected through an optical fiber. As shown in FIG. 1, an eNB 111 is correspondingly connected to a WT 121, and an eNB 112 is correspondingly connected to a WT 122.

The WTs 120 may transmit downlink WLAN data and receive uplink WLAN data. The WTs 120 may be connected to a plurality of WLAN APs 130 at the same time, and may be configured to receive data uplink-transmitted by each WLAN AP 130 or transmit downlink data to the WLAN AP 130 connected thereto. In FIG. 1, a WT 121 is connected to a WLAN AP 131, a WLAN AP 132, and a WLAN AP 133; a WT 122 is connected to the WLAN AP 132, the WLAN AP 133, and a WLAN AP 134. The number of WLAN APs 130 connected to the WTs 120 is not limited in the embodiments of the present disclosure.

The WLAN APs 130 may receive uplink WLAN data and send downlink WLAN data. In actual networking, the WLAN APs 130 may each be an electronic device such as a wireless router or a wireless gateway. The WLAN APs 130 may be connected to a plurality of WTs 120 at the same time. In FIG. 1, the WLAN AP 132 is connected to the WT 121 and the WT 122 at the same time, and the WLAN AP 133 is connected to the WT 121 and the WT 122 at the same time.

The UE 140 may transmit uplink data and receive downlink data. In addition, the UE 140 may also have an LWA function. That is, when WLAN data and LTE data are included in the received downlink data, the UE 140 can aggregate the WLAN data and the LTE data. In the actual networking, each UE 140 may be a mobile phone, a tablet computer, a smart home appliance, a smart device, an Internet of Things device, an Internet of Vehicles, or the like. The specific number and specific location of the UE 140 are not limited in the embodiments of the present disclosure.

Figure 2:
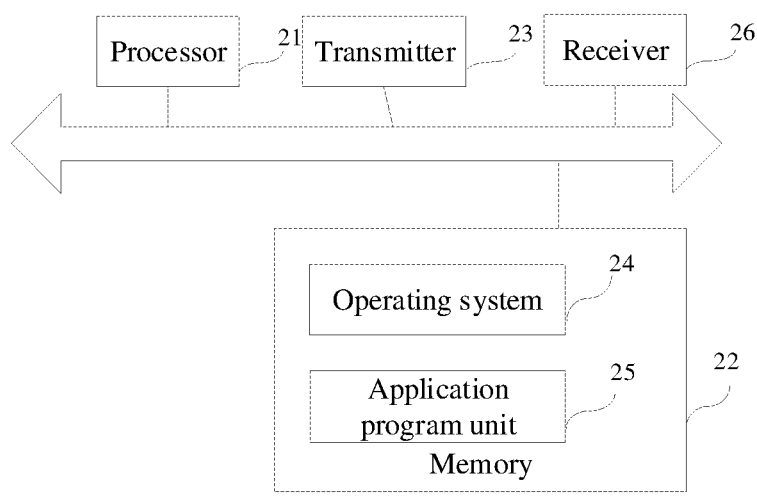
FIG. 2 illustrates a schematic diagram of an eNB provided by an exemplary embodiment of the present disclosure.

FIG. 2 shows a schematic diagram of an eNB 110 provided by an exemplary embodiment. The eNB 110 comprises a processor 21, a memory 22, a transmitter 23, and a receiver 24.

The processor 21 is connected to the memory 22.

The processor 21 comprises one or more processing cores, and is configured to execute various functional applications and information processing by operating software programs and units.

The memory 22 may be configured to store the software programs and units. The memory 22 may store an operating system 24, and an application program unit 25 required for at least one function.

The application program unit 25 may comprise a first reception unit, a second reception unit, and an aggregation unit. The first reception unit is configured to receive an LTE data packet sent by the UE through an LTE network. The UE establishes an RRC connection with the eNB. The second reception unit is configured to receive a WLAN data packet sent by a WT connected thereto, the WLAN data packet including a MAC address of the WT. The WLAN data packet is sent by the WLAN AP connected to the WT to the WT according to the MAC address. The aggregation unit is configured to aggregate the LTE data packet and the WLAN data packet.

Moreover, the memory 22 may be implemented by any type of volatile or non-volatile memory device, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk, or a combination thereof.

The transmitter 23 comprises a modem unit and a multiple input multiple output (MIMO) antenna. The MIMO antenna is an antenna that supports the multi-antenna ports transceiving. In one embodiment, the MIMO antenna comprises at least two transmitting antennas. In one embodiment, the transmitter 23 is used to implement data and signaling transmission.

The receiver 26 comprises the same or similar structure as the transmitter 23. In one embodiment, the receiver 26 comprises a modem unit and a MIMO antenna, and the MIMO antenna comprises at least two receiving antennas.

Those skilled in the art may appreciate that the structure of the eNB 110 shown in FIG. 2 does not constitute a limitation to the eNB 110, and may include more or less components or a combination of certain components, or different component arrangements.

Figure 3:
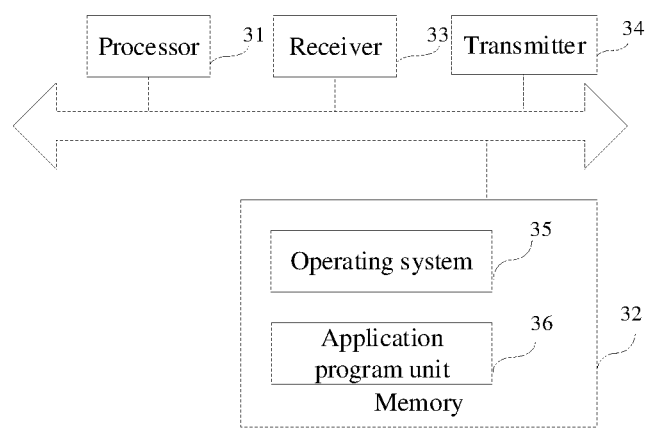
FIG. 3 illustrates a schematic diagram of UE provided by an exemplary embodiment of the present disclosure.

FIG. 3 shows a schematic diagram of UE 140 provided by an exemplary embodiment. The UE 140 comprises a processor 31, a memory 32, a receiver 33, and a transmitter 34.

The processor 31 is connected to the memory 32.

The processor 31 comprises one or more processing cores, and is configured to execute various functional applications and information processing by operating software programs and units.

The memory 32 may be configured to store the software programs and units. The memory 32 may also store an operating system 35, and an application program unit 36 required for at least one function.

The application program unit 36 may comprise a first sending unit and a second sending unit. The first sending unit is configured to send an LTE data packet to a target eNB through an LTE network. The target eNB is an eNB that establishes an RRC connection with the UE. The second sending unit is configured to send a WLAN data packet to a WLAN AP, the WLAN data packet including a MAC address of the target WT connected to the target eNB. The WLAN AP is configured to send a WLAN data packet to the target WT according to the MAC address of the target WT. The target WT is configured to send the WLAN data packet to the target eNB. The target eNB is configured to aggregate the LTE data packet and the WLAN data packet.

Moreover, the memory 32 may be implemented by any type of volatile or non-volatile memory device, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk, or a combination thereof.

The receiver 33 comprises a modem unit and a MIMO antenna, and the MIMO antenna is an antenna that supports transceiving through a plurality of antenna ports. In one embodiment, the MIMO antenna comprises at least two receiving antennas. In one embodiment, the receiver 33 is configured to implement modulation-demodulation and reception of a reference signal.

The transmitter 34 comprises the same or similar structure as the receiver 33. In one embodiment, the transmitter 34 comprises a modem unit and a MIMO antenna. In one embodiment, the MIMO antenna comprises at least two transmitting antennas.

Those skilled in the art may appreciate that the structure of the UE 140 shown in FIG. 3 does not constitute a limitation to the UE 140, and may include more or less components or a combination of certain components, or different component arrangements.

Generally, when the UE 140 resides in a cell provided by an eNB 110, the eNB 110 may establish an RRC connection with the UE 140 and perform communication and data transmission with the UE 140. When the eNB 110 receives data from the core network and needs to downlink-transmit the data to the UE 140, the eNB 110 transmits a part of data to the UE through the LTE network according to the pre-configuration and the current network conditions of the LTE network and the WLAN network, and transmits the remaining data to the UE through the WLAN network.

Contrary to the downlink transmission of data, when it is needed to upload data to the eNB 110, the UE 140 uploads a part of data to the eNB 140 through the LTE network, and uploads the remaining data to the eNB 110 through the WLAN network. The eNB 110 aggregates the received data and sends the aggregated data to the core network.

In related art, since one WLAN AP can be connected to a plurality of WTs at the same time, when UE transmits data to the WLAN AP, the WLAN AP may not determine the WT to which the data is sent.

For example, in related art, when the UE establishes an RRC connection with a first eNB and transmits data to the first eNB, a part of the data is sent to the first eNB through the LTE network, and the remaining data is sent to the WLAN AP. Since the WLAN AP may be connected to a first WT (connected to the eNB) and a second WT (not connected to the eNB) at the same time, the WLAN AP may not determine the WT to which the received data is sent. If the WLAN AP sends the data to the second WT, the second WT receives the data and then sends the received data to a second eNB connected thereto, so that the first eNB can only receive the data sent by the UE through the LTE network, but may not receive the data sent by the UE through the WLAN network, thereby affecting the data aggregation of the first eNB.

In order to solve the problem that occurs when the uplink data is transmitted, the embodiments of the present disclosure provide a data transmission method and a data aggregation method, by which the WLAN AP can accurately transmit data to the target WT after receiving the data. The following description will be made using the schematic embodiments.

Figure 4A:
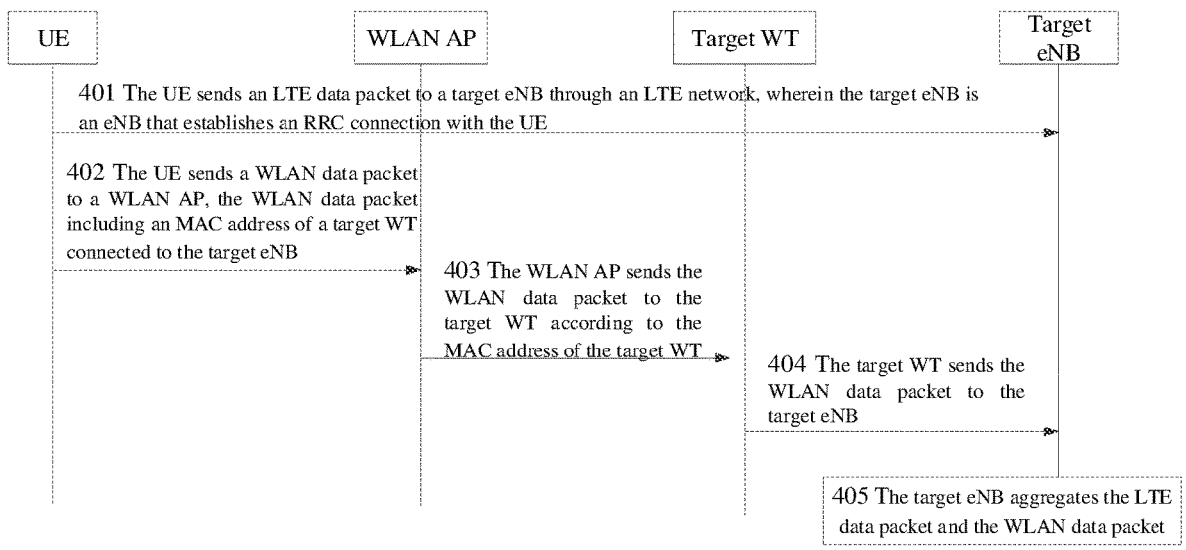
FIG. 4A illustrates a flow chart of a data transmission method provided by an exemplary embodiment of the present disclosure.

FIG. 4A shows a flowchart of a data transmission method provided by an exemplary embodiment. For example, the data transmission method may be applied to the data transmission system shown in FIG. 1. The data transmission method comprises the following steps.

In step 401, the UE sends an LTE data packet to a target eNB through an LTE network, wherein the target eNB is an eNB that establishes an RRC connection with the UE.

When the UE enters a cell covered by the eNB in a power-on state, the UE establishes an RRC connection with the eNB. When the UE leaves the cell covered by the current eNB and enters a cell covered by another eNB, the UE needs to disconnect the RRC connection from the previous eNB and establish an RRC connection with the current eNB. The data transmission method provided by the respective embodiments of the present disclosure is described only by taking the cell in which the UE resides and is covered by the eNB as an example, and does not involve handover between the eNBs.

In case of sending data to the target eNB, the UE may encapsulate the data into an LTE data packet and a WLAN data packet according to a load condition of the current network, and send the LTE data packet to the target eNB through the LTE network. The encapsulation mode of the LTE data packet and the WLAN data packet is not limited in the embodiments of the present disclosure.

In step 402, the UE sends a WLAN data packet to a WLAN AP, the WLAN data packet including a MAC address of a target WT connected to the target eNB.

The UE transmits the WLAN data packet through a WLAN network while transmitting the LTE data packet through the LTE network. In order for the WLAN AP to transmit the received WLAN data packet to the target WT, the UE adds the MAC address of the target WT to the WLAN data packet.

In order to make the UE aware of the MAC address of the target WT, In one embodiment, the MAC address of the target WT may be sent by the target eNB to the UE through RRC signaling.

In step 403, the WLAN AP sends the WLAN data packet to the target WT according to the MAC address of the target WT.

After receiving the WLAN data packet, the WLAN AP parses the WLAN data packet, then obtains the MAC address of the target WT included in the data packet, and sends the WLAN data packet to the target WT.

In step 404, the target WT sends the WLAN data packet to the target eNB.

Since the WT is connected to the eNB in a one-to-one correspondence, after receiving the WLAN data packet, the target WT sends the WLAN data packet to the directly connected target eNB.

In step 405, the target eNB aggregates the LTE data packet and the WLAN data packet.

The eNB aggregates the received LTE data packet and WLAN data packet, and sends the aggregated data to the core network, thereby implementing uplink data transmission.

In the present embodiment, the LTE data packet and the WLAN data packet sent by the UE are accurately sent to the same eNB, and therefore the aggregation at the eNB is ensured. At the same time, the data uploaded by the UE is transmitted in a shunting manner, such that the network congestion caused by transmitting data only through the LTE network is avoided, and the quality of uplink data transmission and the transmission efficiency are improved.

According to the data sending method provided by this embodiment, by adding the MAC address of the target WT connected to the target eNB in the WLAN data packet, the WLAN AP, after receiving the WLAN data packet sent by the UE, can forward the MAC data packet to the target WT according to the MAC address. Finally, the target WT sends the WLAN data packet to the target eNB, thereby implementing uplink transmission of the WLAN data packet, which solves the problem that when the WLAN AP is connected to a plurality of WTs, due to that the WLAN AP may not accurately forward the WLAN data packet to the target WT after receiving the WLAN data packet sent by the UE, the WLAN data packet may not be transmitted to the target eNB. In the case that the WLAN AP is connected to the plurality of WTs, the WLAN AP can forward the WLAN data packet to the target WT according to the MAC address of the target WT in the WLAN data packet, thereby ensuring that the WLAN data packet is transmitted to the target eNB and improving the accuracy of uplink transmission of the WLAN data packet.

Figure 4B:
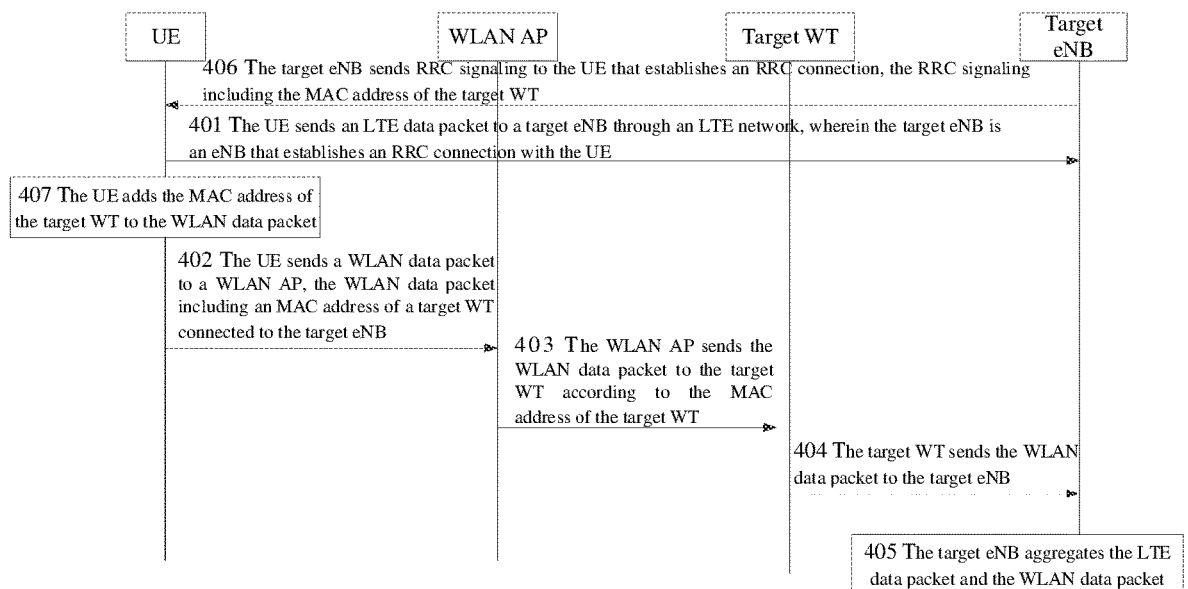
FIG. 4B illustrates a flow chart of a data transmission method provided by another exemplary embodiment of the present disclosure.

In one embodiment, as shown in FIG. 4B, the step 401 further comprises the following steps.

In step 406, the target eNB sends RRC signaling to the UE to establish an RRC connection, the RRC signaling including the MAC address of the target WT.

After establishing the RRC connection with the UE, the target eNB informs the UE of the MAC address of the target WT in a form of RRC signaling, such that the UE may add the MAC address of the target WT to the WLAN data packet when subsequently transmitting the WLAN data packet.

Correspondingly, before the step 402, the following step is further included.

In step 407, the UE adds the MAC address of the target WT to the WLAN data packet.

In one embodiment, a MAC header of the WLAN data packet adopts a frame header format of an 802.11 data frame. The MAC packet header includes an Address 3 which is used to indicate a destination address of the WLAN data packet. The UE acquires the MAC address of the target WT included in the RRC signaling, and sets the Address 3 in the MAC header as the MAC address of the target WT.

Figure 5A:
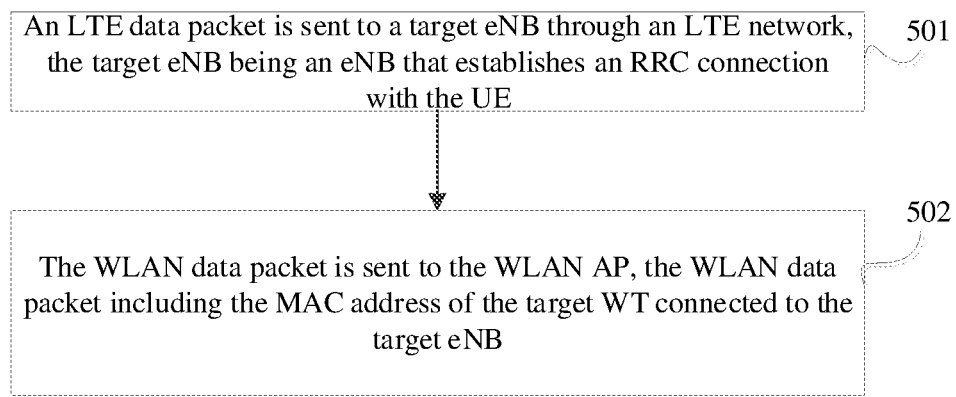
FIG. 5A illustrates a flow chart of a data transmission method provided by an exemplary embodiment of the present disclosure.

FIG. 5A shows a flowchart of a data transmission method provided by an exemplary embodiment. For example, the data transmission method may be applied to the UE 140 shown in FIG. 1. The data transmission method comprises the following steps.

In step 501, an LTE data packet is sent to a target eNB through an LTE network, the target eNB being an eNB that establishes an RRC connection with the UE.

When the UE resides in a cell covered by the eNB and needs to send data to the eNB, in order to avoid the LTE network congestion caused by data transmission only through the LTE network, the UE encapsulates the data into an LTE data packet and a WLAN data packet, and sends the LTE data packet and the WLAN data packet respectively through the LTE network and a WLAN network.

In one embodiment, the eNB acquires current network states of the LTE network and the WLAN network in real time, and determines, in combination with a pre-configuration strategy, which data is transmitted through the LTE network and which data is transmitted through the WLAN network. The network states include network delay, network load, network transmission quality, and the like. The pre-configuration strategy includes a transmission strategy for high-timeliness data, a transmission strategy for low-timeliness data, a transmission strategy for audio and video data, and the like.

The eNB, after determining a data transmission mode, may send a path indication to each UE in the cell by using a form of a broadcast system message, wherein the path indication is used to indicate a manner in which the UE uploads data. It should be noted that the eNB may also send different path indications for different UEs according to services that are enabled by the UEs, which is not limited in this embodiment.

Correspondingly, the UE determines a manner of transmitting data to the eNB according to the path indication, encapsulates the data to be uploaded into an LTE data packet and a WLAN data packet, and performs transmission in the corresponding transmission manner.

For example, the UE encapsulates data with a high timeliness requirement into the LTE data packet according to the received path indication, and transmits the encapsulated data through the LTE network.

In step 502, the WLAN data packet is sent to the WLAN AP, the WLAN data packet including the MAC address of the target WT connected to the target eNB. The WLAN AP is configured to send the WLAN data packet to the target WT according to the MAC address of the target WT. The target WT is configured to transmit the WLAN data packet to the target eNB. The target eNB is configured to aggregate the LTE data packet and the WLAN data packet.

The UE transmits the WLAN data packet to the eNB through the WLAN network while transmitting the LTE data packet to the eNB through the LTE network.

In the data transmission system shown in FIG. 1, a path of the WLAN data packet transmitted by the UE through the WLAN network is UE→WLAN AP→WT→eNB. In order to make the WLAN AP aware of where (WT) the received WLAN data packet is sent to, the WLAN data packet sent by the UE to the WLAN AP includes the MAC address of the target WT, the target WT being a WT connected to the target eNB corresponding to the UE.

For example, referring to FIG. 1, when the UE 141 transmits the WLAN data packet to the eNB 111, the WLAN data packet sent by the UE 141 to the eNB 111 includes the MAC address of the WT 121 connected to the eNB 111. Due to the uniqueness of the MAC address, when the WLAN AP 132 receives the WLAN data packet, it can be determined that the WLAN data packet needs to be sent to the WT 121 instead of the WT 122. After receiving the WLAN data packet sent by the WLAN AP 132, the WT 121 further sends the WLAN data packet to the eNB 111, thereby completing the uplink transmission of the WLAN data. It should be noted that the data has different expression forms in different transmission stages. For example, when the data is transmitted in a physical layer, the data is expressed in a form of a bit stream. When the data is transmitted in a data link layer, the data is expressed as a frame. When the data is transmitted in a network layer, the data is expressed in a form of a packet. The "data packet" in the embodiments is only used as a general term for data in different transmission stages, and is not specific to a specific transmission stage.

According to the data sending method provided by this embodiment, by adding the MAC address of the target WT connected to the target eNB in the WLAN data packet, the WLAN AP, after receiving the WLAN data packet sent by the UE, can forward the MAC data packet to the target WT according to the MAC address. Finally, the target WT sends the WLAN data packet to the target eNB, thereby implementing uplink transmission of the WLAN data packet, which solves the problem that when the WLAN AP is connected to a plurality of WTs, due to that the WLAN AP may not accurately forward the WLAN data packet to the target WT after receiving the WLAN data packet sent by the UE, the WLAN data packet may not be transmitted to the target eNB. In the case that the WLAN AP is connected to the plurality of WTs, the WLAN AP can forward the WLAN data packet to the target WT according to the MAC address of the target WT in the WLAN data packet, thereby ensuring that the WLAN data packet is transmitted to the target eNB and improving the accuracy of uplink transmission of the WLAN data packet.

Figure 5B:
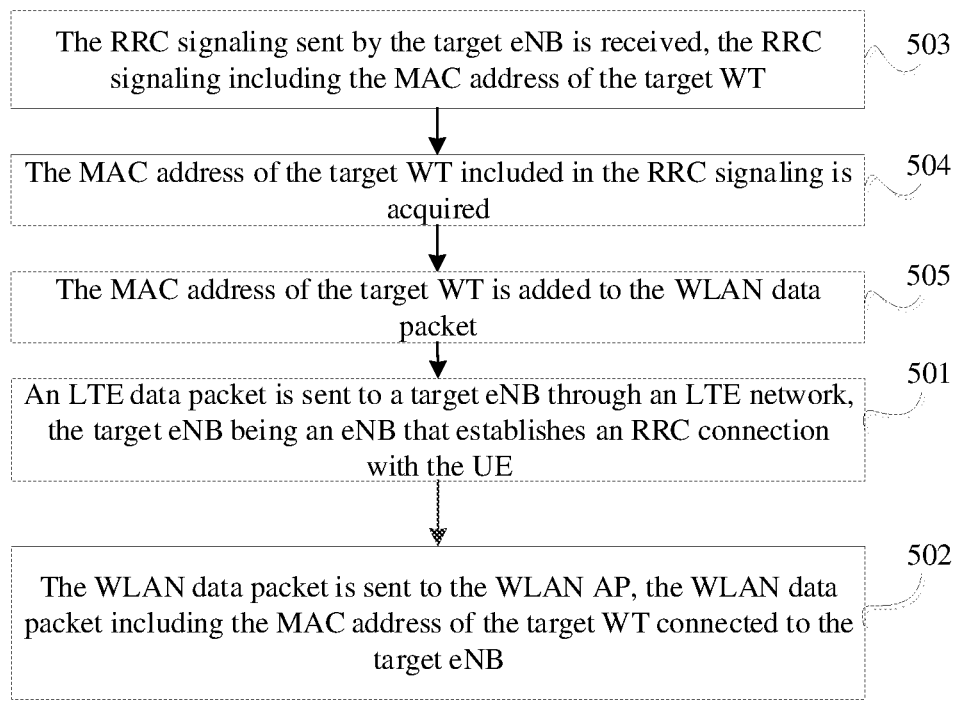
FIG. 5B illustrates a flow chart of a data transmission method provided by another exemplary embodiment of the present disclosure.

In order to make the UE aware of the MAC address of the target WT connected to the target eNB, the eNB may inform each UE in the cell of the MAC address of the target WT in a manner of sending RRC signaling after establishing an RRC connection with the UE. In one embodiment, on the basis of FIG. 5A, the above method further comprises the following steps illustrated in FIG. 5B.

In step 503, the RRC signaling sent by the target eNB is received, the RRC signaling including the MAC address of the target WT.

After establishing an RRC connection with the UE, the target eNB may send the RRC signaling to each UE in a broadcast or unicast manner, the RRC signaling including the MAC address of the target WT connected to the target eNB.

In step 504, the MAC address of the target WT included in the RRC signaling is acquired.

Further, the UE acquires the MAC address of the target WT from the RRC signaling.

In step 505, the MAC address of the target WT is added to the WLAN data packet.

The UE adds the acquired MAC address of the target WT to the WLAN data packet, so that the WLAN AP acquires the MAC address of the target WT and further sends the MAC address.

In one embodiment, the UE may store the MAC address in a MAC header of the WLAN data packet. After the WLAN data packet reaches the WLAN AP, the WLAN AP may extract the MAC address from the MAC header and further send the MAC address.

Herein, the MAC header of the WLAN data packet may adopt a frame header format of an 802.11 data frame (that is, a MAC frame). The format of the 802.11 data frame is as shown in Table 1.

TABLE 1

| Frame Control | Life Cycle ID | Address 1 | Address 2 | Address 3 | Sequence Control | Address 4 | Frame Body | Frame Check |
| --- | --- | --- | --- | --- | --- | --- | --- | --- |

In Table 1, the MAC Header of the 802.11 data frame covers from the frame control to Address 4, and the MAC Body of the 802.11 data frame covers the rest parts. Address 1 is used to indicate a recipient of the data frame. Address 2 is used to indicate a sender of the data frame. Address 3 is used to indicate a destination address of the data frame. Address 4 is used to indicate a source address of the data frame.

When the UE adds the MAC address of the target WT to the WLAN data packet, the Address 3 in the MAC header may be set as the MAC address of the target WT.

Correspondingly, the WLAN AP may acquire the MAC address from the Address 3 of the MAC header while receiving the WLAN data packet.

In this embodiment, the target eNB informs the UE of the MAC of the target WT in a manner of sending RRC signaling. The UE adds the MAC address to the Address 3 of the MAC header of the WLAN data packet, such that the WLAN data packet can be transmitted correctly without modifying the existing WLAN AP, thereby reducing the system transformation cost.

Figure 6A:
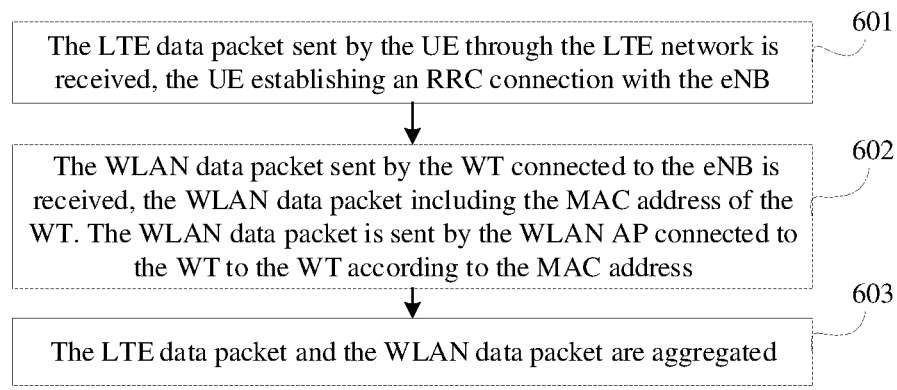
FIG. 6A illustrates a flow chart of a data aggregation method provided by an exemplary embodiment of the present disclosure.

FIG. 6A shows a flowchart of a data aggregation method provided by an exemplary embodiment. For example, the data aggregation method may be applied to the eNB 110 shown in FIG. 1. The data aggregation method comprises the following steps.

In step 601, the LTE data packet sent by the UE through the LTE network is received, the UE establishing an RRC connection with the eNB.

The eNB acquires current network states of the LTE network and the WLAN network, and determines, in combination with a pre-configuration strategy, which data is transmitted through the LTE network and which data is transmitted through the WLAN network. After the data transmission mode is determined, a path indication may be sent to each UE in the cell in a form of a broadcast system message, wherein the path indication is used to indicate the manner in which the UE uploads data.

When the UE in the cell covered by the eNB needs to upload data, the data is uploaded according to the path indication.

When the UE uploads an LTE data packet through the LTE network according to the path indication, the eNB receives the LTE data packet through the LTE network.

In step 602, the WLAN data packet sent by the WT connected to the eNB is received, the WLAN data packet including the MAC address of the WT. The WLAN data packet is sent by the WLAN AP connected to the WT to the WT according to the MAC address.

The eNB also receives the WLAN data packet sent by the UE through the WLAN network while receiving the LTE data packet through the LTE network. In the data transmission system shown in FIG. 1, the path of the WLAN data packet transmitted by the UE through the WLAN network is UE→WLAN AP→WT→eNB.

In order for the WLAN AP to forward the WLAN data packet to a correct WT, the WLAN data packet transmitted by the UE to the WLAN AP includes the MAC address of the target WT connected to the target eNB (which establishes an RRC connection with the UE). The WLAN AP sends the received WLAN data packet to the target WT according to the MAC address. Finally, the target WT sends the WLAN data packet to the target eNB.

In step 603, the LTE data packet and the WLAN data packet are aggregated.

The LTE data packet sent by one UE through the LTE network and the WLAN data packet sent by the same UE through the WLAN network finally reach a target eNB, and are then aggregated by the target eNB, such that the data uploaded by the UE is recovered. Since the data uploaded by the UE is sent in a shunting manner, the amount of data transmitted through the LTE network is reduced, the congestion of the LTE network is avoided, and the data transmission efficiency and quality are improved.

According to the data sending method provided by the embodiments, by adding the MAC address of the target WT connected to the target eNB in the WLAN data packet, the WLAN AP, after receiving the WLAN data packet sent by the UE, can forward the MAC data packet to the target WT according to the MAC address. Finally, the target WT sends the WLAN data packet to the target eNB, thereby implementing uplink transmission of the WLAN data packet, which solves the problem that when the WLAN AP is connected to a plurality of WTs, due to that the WLAN AP may not accurately forward the WLAN data packet to the target WT after receiving the WLAN data packet sent by the UE, the WLAN data packet may not be transmitted to the target eNB. In the case that the WLAN AP is connected to the plurality of WTs, the WLAN AP can forward the WLAN data packet to the target WT according to the MAC address of the target WT in the WLAN data packet, thereby ensuring that the WLAN data packet is transmitted to the target eNB and improving the accuracy of uplink transmission of the WLAN data packet.

Figure 6B:
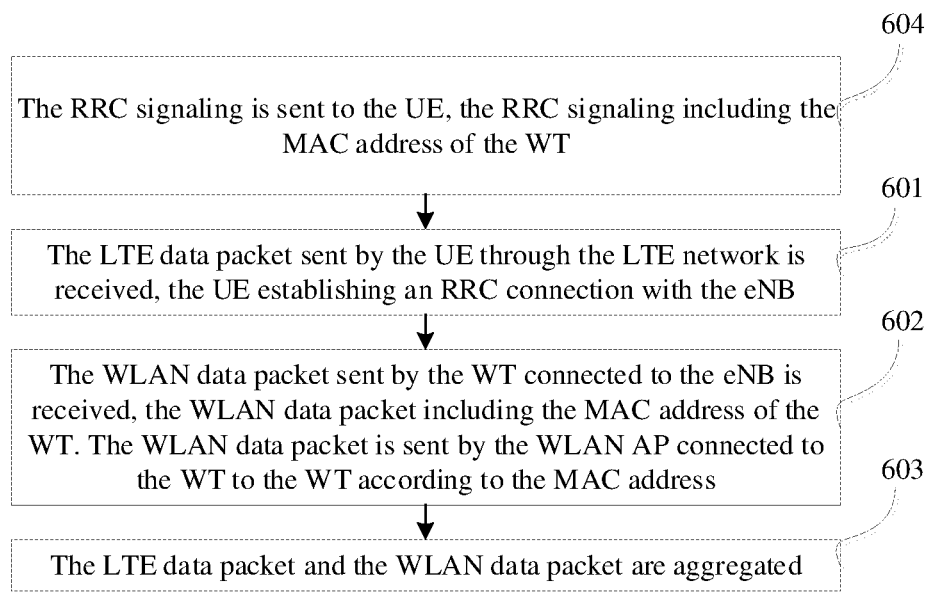
FIG. 6B illustrates a flow chart of a data aggregation method provided by another exemplary embodiment of the present disclosure.

After establishing an RRC connection with the UE, the eNB may inform each UE in the cell of the MAC address of the target WT in a manner of sending RRC signaling. In one embodiment, shown in FIG. 6B, before the step 601, the following step is further included.

In step 604, the RRC signaling is sent to the UE, the RRC signaling including the MAC address of the WT. The UE is configured to set the Address 3 in the MAC header of the WLAN data packet as the MAC address of the WT. The Address 3 is used to indicate the destination address of the WLAN data packet. The MAC header adopts a frame header format of an 802.11 data frame.

After establishing the RRC connection with the UE, the RRC signaling may be sent to each UE in a broadcast or unicast manner, the RRC signaling including the MAC address of the target WT connected to the target eNB.

Correspondingly, the UE receives and acquires the MAC address of the target WT included in the RRC signaling, and adds the MAC address to the WLAN data packet when transmitting the WLAN data packet through the WLAN network.

In one embodiment, the UE may store the MAC address in the MAC header of the WLAN data packet. After the WLAN data packet reaches the WLAN AP, the WLAN AP may extract the MAC address from the MAC header and further transmit the MAC address. Specifically, the MAC header of the WLAN data packet may adopt a frame header format of an 802.11 data frame (i.e., a MAC frame). The UE adds the MAC address of the target WT to the Address 3 of the MAC header. The address 3 is used to indicate the destination address of the WLAN data packet.

In this embodiment, the target eNB informs the UE of the MAC of the target WT in a manner of sending RRC signaling. The UE adds the MAC address to the Address 3 of the MAC header of the WLAN data packet, such that the WLAN data packet can be transmitted correctly without modifying the existing WLAN AP, thereby reducing the system transformation cost.

The followings are the device embodiments of the present disclosure, which may be used to implement the method embodiments of the present disclosure.

Figure 7:
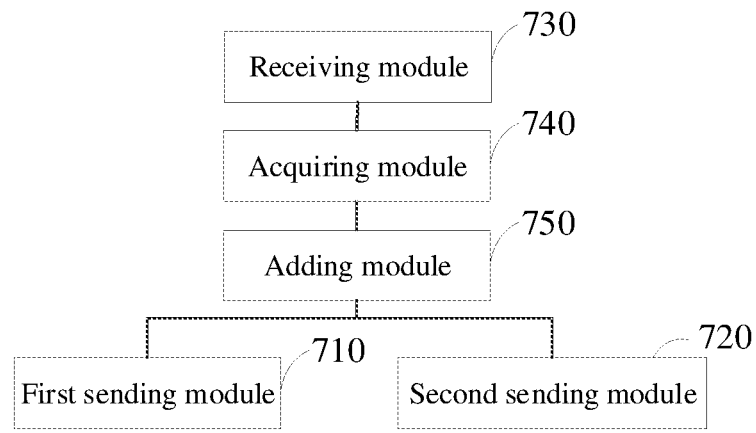
FIG. 7 illustrates a block diagram of a data transmission device provided by an exemplary embodiment of the present disclosure.

FIG. 7 illustrates a block diagram of a data transmission device provided by an exemplary embodiment of the present disclosure. The data transmission device may be implemented to be a whole or part of the UE 140 shown in FIG. 1 through a hardware circuit, or a combination of hardware and software. The data transmission device includes: a first sending module 710 configured to send an LTE data packet to a target eNB through an LTE network, the target eNB being an eNB that establishes an RRC connection with the UE; and a second sending module 720 configured to send a WLAN data packet to the WLAN AP, the WLAN data packet including a MAC address of a target WT connected to the target eNB. The WLAN AP is configured to send the WLAN data packet to the target WT according to the MAC address of the target WT, and the target WT is configured to send the WLAN data packet to the target eNB; the target eNB is configured to aggregate the LTE data packet and the WLAN data packet.

In one embodiment, the device further includes: a receiving module 730 configured to receive RRC signaling sent by the target eNB, the RRC signaling including a MAC address of the target WT; an acquiring module 740 configured to acquire the MAC address of the target WT included in the RRC signaling; and an adding module 750 configured to add the MAC address of the target WT to the WLAN data packet.

In one embodiment, a MAC header of the WLAN data packet adopts a frame header format of an 802.11 data frame, the MAC header including an Address 3 which is used to indicate a destination address of the WLAN data packet; and the adding module is configured to set the Address 3 in the MAC header as the MAC address of the target WT.

According to the data transmission device provided by the embodiments, by adding the MAC address of the target WT connected to the target eNB in the WLAN data packet, the WLAN AP, after receiving the WLAN data packet sent by the UE, can forward the MAC data packet to the target WT according to the MAC address. Finally, the target WT sends the WLAN data packet to the target eNB, thereby implementing uplink transmission of the WLAN data packet, which solves the problem that when the WLAN AP is connected to a plurality of WTs, due to that the WLAN AP may not accurately forward the WLAN data packet to the target WT after receiving the WLAN data packet sent by the UE, the WLAN data packet may not be transmitted to the target eNB. In the case that the WLAN AP is connected to the plurality of WTs, the WLAN AP can forward the WLAN data packet to the target WT according to the MAC address of the target WT in the WLAN data packet, thereby ensuring that the WLAN data packet is transmitted to the target eNB and improving the accuracy of uplink transmission of the WLAN data packet.

In the embodiments, the target eNB informs the UE of the MAC of the target WT in a manner of sending RRC signaling. The UE adds the MAC address to the Address 3 of the MAC header of the WLAN data packet, such that the WLAN data packet can be transmitted correctly without modifying the existing WLAN AP, thereby reducing the system transformation cost.

Figure 8:
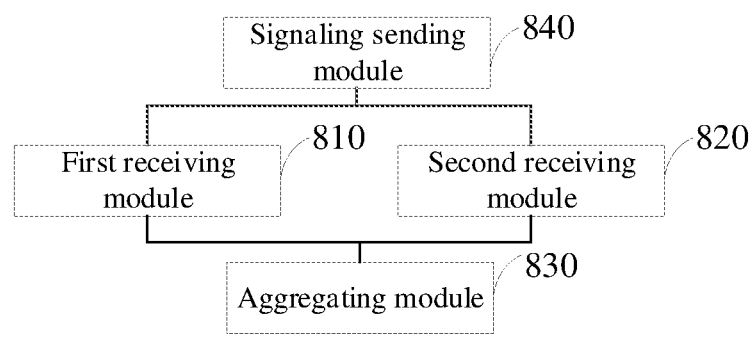
FIG. 8 illustrates a block diagram of a data aggregation device provided by an exemplary embodiment of the present disclosure.

FIG. 8 illustrates a block diagram of a data aggregation device provided by an exemplary embodiment of the present disclosure. The data aggregation device may be implemented to be a whole or part of the eNB 110 shown in FIG. 1 through a hardware circuit, or a combination of hardware and software. The data aggregation device includes: a first receiving module 810 configured to receive an LTE data packet sent by UE through an LTE network, the UE establishing an RRC connection with the eNB; a second receiving module 820 configured to receive a WLAN data packet sent by a connected WT, the WLAN data packet including a MAC address of the WT and being sent by the WLAN AP connected to the WT to the WT according to the MAC address; and an aggregating module 830 configured to aggregate the LTE data packet and the WLAN data packet.

In one embodiment, the device further includes a signaling sending module 840 configured to send RRC signaling to the UE, the RRC signaling including the MAC address of the WT, wherein the UE is configured to set an Address 3 in the MAC header of the WLAN data packet as the MAC address of the WT; the Address 3 is used to indicate a destination address of the WLAN data packet; the MAC header adopts a frame header format of an 802.11 data frame.

According to the data aggregation device provided by the embodiments, by adding the MAC address of the target WT connected to the target eNB in the WLAN data packet, the WLAN AP, after receiving the WLAN data packet sent by the UE, can forward the MAC data packet to the target WT according to the MAC address. Finally, the target WT sends the WLAN data packet to the target eNB, thereby implementing uplink transmission of the WLAN data packet, which solves the problem that when the WLAN AP is connected to a plurality of WTs, due to that the WLAN AP may not accurately forward the WLAN data packet to the target WT after receiving the WLAN data packet sent by the UE, the WLAN data packet may not be transmitted to the target eNB. In the case that the WLAN AP is connected to the plurality of WTs, the WLAN AP can forward the WLAN data packet to the target WT according to the MAC address of the target WT in the WLAN data packet, thereby ensuring that the WLAN data packet is transmitted to the target eNB and improving the accuracy of uplink transmission of the WLAN data packet.

In the embodiments, the target eNB informs the UE of the MAC of the target WT in a manner of sending RRC signaling. The UE adds the MAC address to the Address 3 of the MAC header of the WLAN data packet, such that the WLAN data packet can be transmitted correctly without modifying the existing WLAN AP, thereby reducing the system transformation cost.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples are considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A data transmission system, comprising:
a plurality of evolutional Node B (eNBs), a plurality of wireless local area network terminations (WTs), a plurality of wireless local area network access points (WLAN APs), and user equipment (UE),
wherein the WTs are connected to the eNBs in a one-to-one correspondence, and each WLAN AP is connected to more than one of the WTs;
the UE is configured to receive a path indication sent by a target eNB, wherein the path indication is configured to indicate a manner in which the UE transmits data to the target eNB;
the UE is configured to send a long term evolution (LTE) data packet to the target eNB through an LTE network, the target eNB being an eNB that establishes a radio resource control (RRC) connection with the UE;
the UE is configured to send a wireless local area network (WLAN) data packet to an WLAN AP of the WLAN APs, the WLAN data packet comprising a medium access control (MAC) address of a target WT connected to the target eNB;
the WLAN AP is configured to send the WLAN data packet to the target WT according to the MAC address of the target WT;
the target WT is configured to send the WLAN data packet to the target eNB; and
the target eNB is configured to aggregate the LTE data packet and the WLAN data packet.

2. The system according to claim 1, wherein:
the target eNB is further configured to send RRC signaling to the UE to establish the RRC connection, the RRC signaling comprising a MAC address of the target WT; and
the UE is further configured to add the MAC address of the target WT to the WLAN data packet.

3. The system according to claim 2, wherein:
a MAC header of the WLAN data packet adopts a frame header format of an 802.11 data frame, the MAC header comprising an Address 3 to indicate a destination address of the WLAN data packet; and
the UE is further configured to acquire the MAC address of the target WT included in the RRC signaling, and set the Address 3 in the MAC header as the MAC address of the target WT.

4. The system according to claim 1, wherein:
the UE is further configured to encapsulate data with a high timeliness requirement into the LTE data packet according to the path indication.

5. A data transmission method, applied to user equipment (UE) in a data transmission system which comprises a plurality of evolutional Node B (eNBs), a plurality of wireless local area network terminations (WTs), a plurality of wireless local area network access points (WLAN APs), and the UE, wherein the WTs are connected to the eNBs in a one-to-one correspondence, and each WLAN AP is connected to more than one of the WTs, the method comprising:
receiving, by the UE, a path indication sent by a target eNB, wherein the path indication is configured to indicate a manner in which the UE transmits data to the target eNB;
sending, by the UE, a long term evolution (LTE) data packet to the target eNB through an LTE network, the target eNB being an eNB that establishes a radio resource control (RRC) connection with the UE; and
sending, by the UE, a wireless local area network (WLAN) data packet to a wireless local area network access point (WLAN AP), the WLAN data packet comprising a medium access control (MAC) address of a target WT connected to the target eNB, wherein the WLAN AP is configured to send the WLAN data packet to the target WT according to the MAC address of the target WT; the target WT is configured to send the WLAN data packet to the target eNB; and the target eNB is configured to aggregate the LTE data packet and the WLAN data packet.

6. The method according to claim 5, further comprising:
receiving, by the UE, RRC signaling sent by the target eNB, the RRC signaling comprising a MAC address of the target WT;
acquiring, by the UE, the MAC address of the target WT included in the RRC signaling; and
adding, by the UE, the MAC address of the target WT to the WLAN data packet.

7. The method according to claim 6, wherein a MAC header of the WLAN data packet adopts a frame header format of an 802.11 data frame, the MAC header comprising an Address 3 to indicate a destination address of the WLAN data packet; and the adding the MAC address of the target WT to the WLAN data packet comprises:
setting, by the UE, the Address 3 in the MAC header as the MAC address of the target WT.

8. The method according to claim 5, further comprising:
after receiving the path indication sent by the target eNB, encapsulating, by the UE, data with a high timeliness requirement into the LTE data packet according to the path indication.

9. A data aggregation method, applied to an evolutional Node B (eNB) in a data transmission system which comprises a plurality of evolutional Node B (eNBs), a plurality of wireless local area network terminations (WTs), a plurality of wireless local area network access points (WLAN APs), and user equipment (UE), wherein the WTs are connected to the eNBs in a one-to-one correspondence, and each WLAN AP is connected to more than one of the WTs, the method comprising:
sending, by the eNB, a path indication to the UE, wherein the path indication is configured to indicate a manner in which the UE transmits data to the eNB;
receiving, by the eNB, a long term evolution (LTE) data packet sent by the UE through an LTE network, the UE establishing a radio resource control (RRC) connection with the eNB;
receiving, by the eNB, a wireless local area network (WLAN) data packet sent by a wireless local area network termination (WT) connected to the eNB, the WLAN data packet comprising a medium access control (MAC) address of the WT and being sent to the WT by a wireless local area network access point (WLAN AP) connected to the WT according to the MAC address; and
aggregating, by the eNB, the LTE data packet and the WLAN data packet.

10. The method according to claim 9, further comprising:
sending, by the eNB, RRC signaling to the UE, the RRC signaling comprising the MAC address of the WT, wherein the UE is configured to set an Address 3 in the MAC header of the WLAN data packet as the MAC address of the WT; the Address 3 indicates a destination address of the WLAN data packet; and the MAC header adopts a frame header format of an 802.11 data frame.

11. The method according to claim 9, further comprising:
instructing, by the eNB, the UE to encapsulate data with a high timeliness requirement into the LTE data packet according to the path indication.

12. The method according to claim 9, wherein the WLAN data packet is sent to the WLAN AP by the UE.

13. User equipment (UE), comprising:
a processor; and
a memory for storing instructions executable by the processor;
wherein the processor is configured to:
receive a path indication sent by a target evolutional Node B (eNB), wherein the path indication is configured to indicate a manner in which the UE transmits data to the target eNB;
send a long term evolution (LTE) data packet to the target eNB through an LTE network, the target eNB being an eNB among a plurality of eNBs that establishes a radio resource control (RRC) connection with the UE; and
send a wireless local area network (WLAN) data packet to a wireless local area network access point (WLAN AP), the WLAN data packet comprising a medium access control (MAC) address of a target WT among a plurality of WTs that is connected to the target eNB, wherein the WTs are connected to the eNBs in a one-to-one correspondence, and each WLAN AP is connected to more than one of the WTs, wherein the WLAN AP is configured to send the WLAN data packet to the target WT according to the MAC address of the target WT; the target WT is configured to send the WLAN data packet to the target eNB; and the target eNB is configured to aggregate the LTE data packet and the WLAN data packet.

14. The UE according to claim 13, wherein the processor is further configured to:
receive RRC signaling sent by the target eNB, the RRC signaling comprising a MAC address of the target WT;
acquire the MAC address of the target WT included in the RRC signaling; and
add the MAC address of the target WT to the WLAN data packet.

15. The UE according to claim 13, wherein a MAC header of the WLAN data packet adopts a frame header format of an 802.11 data frame, the MAC header comprising an Address 3 to indicate a destination address of the WLAN data packet; and the processor is further configured to:
set the Address 3 in the MAC header as the MAC address of the target WT.

16. The UE according to claim 13, wherein the processor is further configured to:
encapsulate, after receiving the path indication sent by the target eNB, data with a high timeliness requirement into the LTE data packet according to the path indication.

17. An evolutional Node B (eNB), comprising:
a processor; and
a memory for storing instructions executable by the processor;
wherein the processor is configured to:
send a path indication to user equipment (UE), wherein the path indication is configured to indicate a manner in which the UE transmits data to the eNB;
receive a long term evolution (LTE) data packet sent by the UE through an LTE network, the UE establishing a radio resource control (RRC) connection with the eNB among a plurality of eNBs;
receive a wireless local area network (WLAN) data packet sent by a wireless local area network termination (WT) among a plurality of WTs that is connected to the eNB, the WLAN data packet comprising a medium access control (MAC) address of the WT and being sent to the WT by a wireless local area network access point (WLAN AP) connected to the WT according to the MAC address, wherein the WTs are connected to the eNBs in a one-to-one correspondence, and each WLAN AP is connected to more than one of the WTs; and
aggregate the LTE data packet and the WLAN data packet.

18. The eNB according to claim 17, wherein the processor is further configured to:
send RRC signaling to the UE, the RRC signaling comprising the MAC address of the WT, wherein the UE is configured to set an Address 3 in the MAC header of the WLAN data packet as the MAC address of the WT; the Address 3 indicates a destination address of the WLAN data packet; and the MAC header adopts a frame header format of an 802.11 data frame.

19. The eNB according to claim 17, wherein the processor is further configured to:
instruct the UE to encapsulate data with a high timeliness requirement into the LTE data packet according to the path indication.

20. The eNB according to claim 17, wherein the WLAN data packet is sent to the WLAN AP by the UE.

* * * * *